United States Patent
Sanghera et al.

(10) Patent No.: US 6,993,230 B2
(45) Date of Patent: Jan. 31, 2006

(54) HOLLOW CORE PHOTONIC BAND GAP INFRARED FIBERS

(75) Inventors: Jasbinder Sanghera, Ashburn, VA (US); Ishwar Aggarwal, Fairfax Station, VA (US); Leslie B. Shaw, Woodbridge, VA (US); Pablo C. Pureza, Burke, VA (US); Fred Kung, Alexandria, VA (US); Brian Cole, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 104 days.

(21) Appl. No.: 10/632,210

(22) Filed: Aug. 1, 2003

(65) Prior Publication Data

US 2005/0025965 A1 Feb. 3, 2005

(51) Int. Cl.
G02B 6/02 (2006.01)

(52) U.S. Cl. .................... 385/125; 385/123; 385/122; 385/141

(58) Field of Classification Search ............... 385/123, 385/122, 124, 125, 126, 127, 128, 141
See application file for complete search history.

(56) References Cited

U.S. PATENT DOCUMENTS

| | | | |
|---|---|---|---|
| 6,539,155 B1 * | 3/2003 | Broeng et al. ............... | 385/125 |
| 2003/0231846 A1 * | 12/2003 | Fajardo et al. ............... | 385/125 |
| 2004/0071423 A1 * | 4/2004 | Libori et al. ............... | 385/127 |
| 2004/0096173 A1 * | 5/2004 | Fekety et al. ............... | 385/125 |
| 2004/0151454 A1 * | 8/2004 | Fajardo et al. ............... | 385/126 |
| 2004/0228592 A1 * | 11/2004 | Gaeta et al. ............... | 385/126 |
| 2005/0025965 A1 * | 2/2005 | Sanghera et al. ........... | 428/364 |

OTHER PUBLICATIONS

Sanghera et al., "Infrared Fibers for Missle Jamming", Energetic Particles, Plasmas, and Beams, Sep. 2002, pp. 127–129.

* cited by examiner

Primary Examiner—Brian M. Healy
(74) Attorney, Agent, or Firm—George A. Kap; John J. Karasek

(57) ABSTRACT

This invention pertains to a hollow core photonic band gap chalcogenide optical glass fiber and to a fabrication method for making the fiber. The fiber, which is 80–1000 microns in outside diameter, is characterized by a solid glass circumferential region and a structured region disposed centrally within the solid region, the structured region includes a hollow core of 1 micron to several hundreds of microns in diameter surrounded by a plurality of parallel hollow capillaries extending parallel to the core, the core being centrally and longitudinally located within the fiber. Ratio of open space to glass in the structured region is 30–99%. The fabrication method includes the steps of providing a mold, placing chalcogenide micro-tubes around the mold, stacking chalcogenide micro-canes around the stacked micro-tubes, fusing the micro-tubes and the micro-canes to form a preform, removing the mold and drawing the preform to obtain the fiber. In an alternative fabrication method, the fiber is made by extruding flowing chalcogenide glass through suitably made plate to form a preform and then drawing the preform to form the fiber.

11 Claims, 2 Drawing Sheets

HOLLOW CORE PHOTONIC BAND GAP INFRARED FIBERS

BACKGROUND OF THE INVENTION

1. Field of the Invention

This invention pertains to hollow core photonic band gap chalcogenide fibers and to the method of making same.

2. Description of Related Art

Practically every molecular species possesses a characteristic vibrational spectrum in the infrared wavelength region between about 2 and 12 $\mu$m. Consequently, chemicals can be clearly and definitely identified based on their unique infrared absorption spectra. In fact, this is called the "fingerprint region." Detection and identification can be performed on liquids, gases and solids using traditional infrared (IR) spectrometers and Fourier Transform Infrared spectrometers. The chemicals can be detected using various modes including absorption and reflectance spectroscopy.

Fiber optic based sensors have been developed using chalcogenide glass fibers. Chalcogenide fibers transmit in the fingerprint region and can be coupled to an IR spectrometer. In this case, the evanescent field propagating outside the core can be accessed by removal of the cladding via etching or by reducing the diameter of the fiber by stretching. The evanescent field on the outside surface of the fiber, can interact with the surrounding analyte and provide definitive chemical identification even in mixtures. The advantage of the fiber approach is that the sensing can now be done remotely but one drawback of the evanescent spectroscopy is that the technique has limited sensitivity since only a small fraction, i.e., a few percent, of the light propagates in the evanescent field. Furthermore, the field decays exponentially from the surface of the fiber and so only analyte at the surface will interact with the evanescent field. Therefore, while IR spectroscopy is a very powerful tool for definitive chemical identification, there is a need to improve the sensitivity so that it will find widespread use.

Hollow core silica fibers with a structured region providing a photonic band gap have been known since about 1999. Photonic band gap fibers have been recently demonstrated using silica glass with a minimum loss of 13 dB/km at 1.5 $\mu$m. It would be obvious use hollow core photonic band gap silica fiber to transmit wavelengths longer than 1.5 $\mu$m since it was believed that the light was guided in the hollow core and therefore 2–12 $\mu$m light can be used to perform fingerprint IR spectroscopy. However, it turns out that hollow core PBG silica fibers do not transmit well beyond about 2 $\mu$m since several percent of the light propagates in the microstructured region and this light is highly attenuated through multiphonon absorption in silica. Hence, it is not possible to use silica PBG fibers to perform fingerprint spectroscopy in the IR beyond a wavelength of about 2 $\mu$m.

OBJECTS AND BRIEF SUMMARY OF THE INVENTION

An object of this invention is a hollow core photonic band gap chalcogenide glass fiber.

It is another object of this invention to sense molecular species in the fingerprint region of the vibrational spectrum of about 2 to 12 $\mu$m at levels of parts per billion (ppb).

It is another object of this invention to increase sensitivity of sensing molecular species over evanescent technique by hundreds of times.

It is another object of this invention to use the hollow core fiber of this invention for transmission of higher power sources, exceeding power density of 10 $GW/cm^2$ pulse power for pulsed lasers and exceeding power of about 10 W for continuous wave lasers.

It is another object of this invention to fabricate hollow core photonic band gap glass fibers from chalcogenide glass.

These and other objects of this invention can be accomplished by a hollow core photonic band gap fiber made totally from chalcogenide glass that can sense molecular species in the spectrographic region of about 2–12 $\mu$m and that can transmit ultrahigh power light signals, the glass fiber having a hollow core for passing a light signal therethrough, a microstructured region surrounding the hollow core, and a solid circumferential region surrounding the microstructured region.

DETAILED DESCRIPTION OF THE INVENTION

This invention pertains to a hollow core photonic band gap chalcogenide optical fiber and to a fabrication method for making the fiber.

Figure 1:
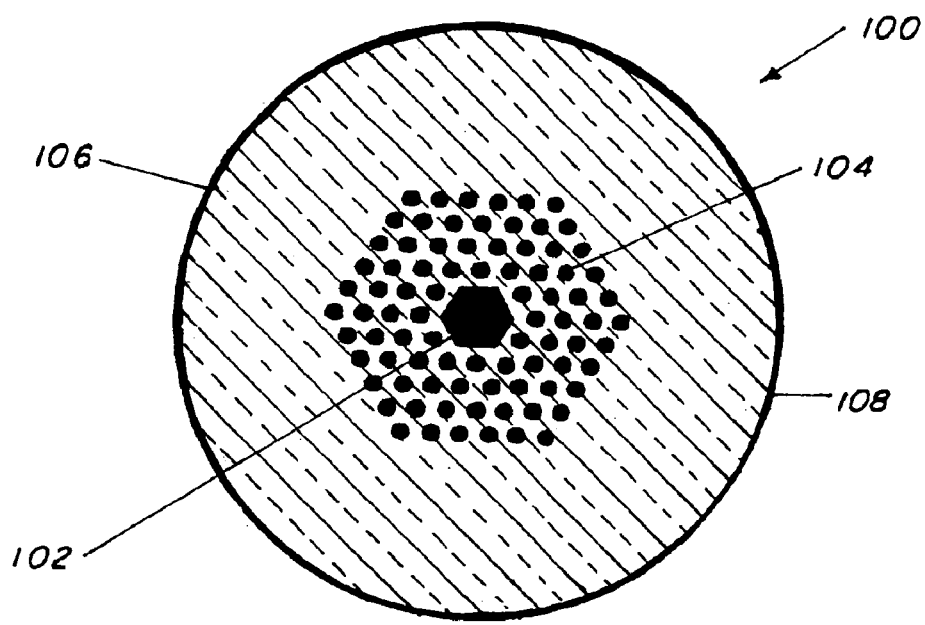
FIG. 1 is a schematic illustration in cross-section of a hollow core photonic band gap chalcogenide fiber showing the hollow core, the microstructured region concentrically surrounding the hollow core and a solid glass circumferential region surrounding the microstructured region.

An illustration of a typical hollow core photonic band gap infrared fiber in cross-section is shown in FIG. 1 where the fiber 100 includes hollow core 102, microstructured region in hexagonal or honeycomb or any other shape 104, and circumferential region 106. The fiber is typically made from chalcogenide glasses but can also be made from chalcohalide glasses and other infrared transmitting glasses. The fiber 100 is typically circular in cross-section although it can be of any other shape and its outside diameter is typically in the range of 80–1000 $\mu$m. Hollow core 102 can be hexagonal in cross-sectional shape, circular or any other shape, although, typically, it is circular. The hollow core diameter is typically from 1 $\mu$m to several 100s $\mu$m, more typically 2–200 $\mu$m. Openings 108 in the microstructured region 104 are typically circular in cross-section although they can be of any other shape. The diameter of the openings are typically from a fraction of a micron to about 10 $\mu$m in diameter with a center-to-center spacing or periodicity of 1–12 $\mu$m. In the microstructured region of the fiber, air fill fraction should be 30–99%, preferably 40–70%. The purpose of the openings is to create the photonic band gap which channels light into the hollow core. In absence of the microstructured region, which imparts photonic band gap to the fiber, the light passing through the hollow core would be scattered or lost and the fiber would not be functional for the intended purpose. It is believed that at least three courses i.e., layers around the center hollow core 102, of the openings disposed in a particular arrangement are needed to create the photonic band. The arrangement of the openings can be in hexagonal or honeycomb structure or in any other periodic or non-periodic way that produces the photonic band gap. Openings 108 are typically arranged in hexagonal pattern and typically there are 4–5 courses of the openings in the microstructured region 104 disposed concentrically around the hollow core 102 although, there may be fewer than four or more than four courses.

Thickness of the solid region 106 is typically 5–500 µm, and more typically 50–300 µm, although it will depend on the glass composition and other parameters to provide physical integrity to the microstructured region 104. Thickness of the microstructured region is 5–500 µm, preferably 20–300 µm.

Glass fiber 100 in FIG. 1 is made of chalcogenide glass, which is a vitreous material composed of the chalcogen elements of Group VI of the Periodic Table. These elements are usually mixed with elements of Groups IV and V to form the familiar compound glasses. More particularly, chalcogenide glasses are made from mixtures containing at least one of sulfur, selenium, and tellurium. Other elements can be added. Examples of other elements that can be combined with at least one chalcogen element include germanium, arsenic, and antimony.

Chalcogenide glass typically contains at least about 25 mole percent, and generally at least 50 mole percent, of one or more of the three chalcogen elements. The presence of tellurium in the glass composition has been found to increase the transmission in the infrared region. While sulphide fibers, such as $As_2 S_3$, transmit from about 1–6 µm, the transmission window is increased to beyond 10 µm by including the heavier chalcogenide element tellurium. Glasses containing high levels of tellurium typically transmit in the 3–12 µm region.

The use of chalcogenide fibers is advantageous not only for wide transmittance range but also for chemical durability. Although chalcogenide glass cannot be used in strongly basic environments because it undergoes chemical attack, there are numerous environments where chalcogenide fibers can be used. For instance, chalcogenide glass does not react with water, unlike fluoride glass, and can, therefore, be used in aqueous non-basic environments. Additionally, chalcogenide glass can be used in acidic and organic environments.

The fiber of this invention can also be made from mixtures of halide and chalcogenide glass components. Halide glasses, such as ZBLAN (53$ZrF_6$-20 $BaF_2$-4$LaF_3$-3$AlF_3$-20NaF by mole percent) with more than about 5% of a halide, such as bromine or fluorine, have relatively poor chemical durability and low glass transition temperatures, especially the non-fluoride glasses, whereas chalcogenide glasses are well known for their chemical durability but their relatively high refractive indices give rise to high reflectivities from the glass surface. Chalcohalides contain both halides and chalcogens and have some beneficial characteristics of both glasses. The structural aspect of these glasses is interesting from a fundamental viewpoint since chalcogenide glasses are predominantly covalent and halide glasses are predominantly ionic in character. As used herein, the term "chalcogenide" includes "chalcohalide."

The photonic band gap hollow fibers of this invention can have a polymeric material cladding, or a cladding of any other material, on the outside of the fiber 100, although such cladding is not required. The cladding is provided on the fiber to facilitate handling thereof. The cladding material can be hydrophobic or hydrophilic, typically it is hydrophobic for obvious reasons. Some hydrophobic polymeric materials in an aqueous environment containing a hydrophobic analyte will repel water but will preferably solubilize the hydrophobic analyte. Specific examples of the polymeric materials include low density polyethylene and polydimethylsiloxane. There are other polymeric materials which do not allow species to penetrate them.

The periodic layered structure of holes and glass in the microstructured region of the hollow core fiber of this invention, shown in cross-section in FIG. 1, creates a photonic band gap that prevents light from propagating in the microstructured region, analogous to a 2 D grating, and so light is confined to the hollow core. Typically, the periodicity of the holes is on the scale of the wavelength of light and the outer glass or the circumferential glass region is used for providing mechanical integrity to the fiber. The fact that light travels in the hollow core also means that the losses will be lower so longer path lengths can be used. Since light is guided in the hollow core, an analyte disposed therein will have maximum interaction with light, unlike the prior art evanescent sensors.

Figure 2:
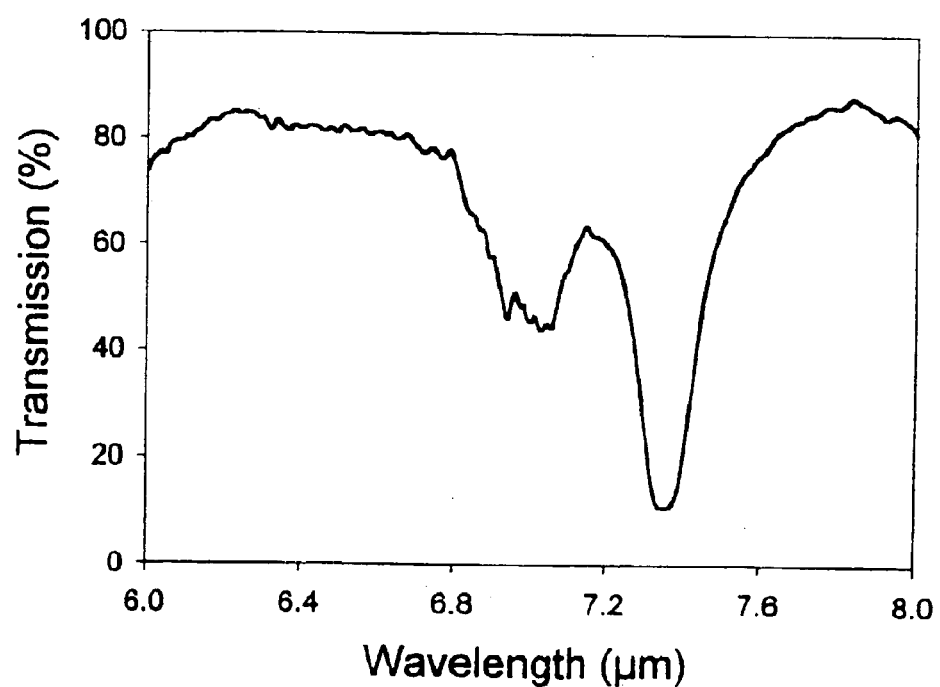
FIG. 2 is an exemplary graph of the molecular specie of acetone in the 6–8 $\mu$m wavelength region which is sensed by the fiber of this invention.
Figure 3:
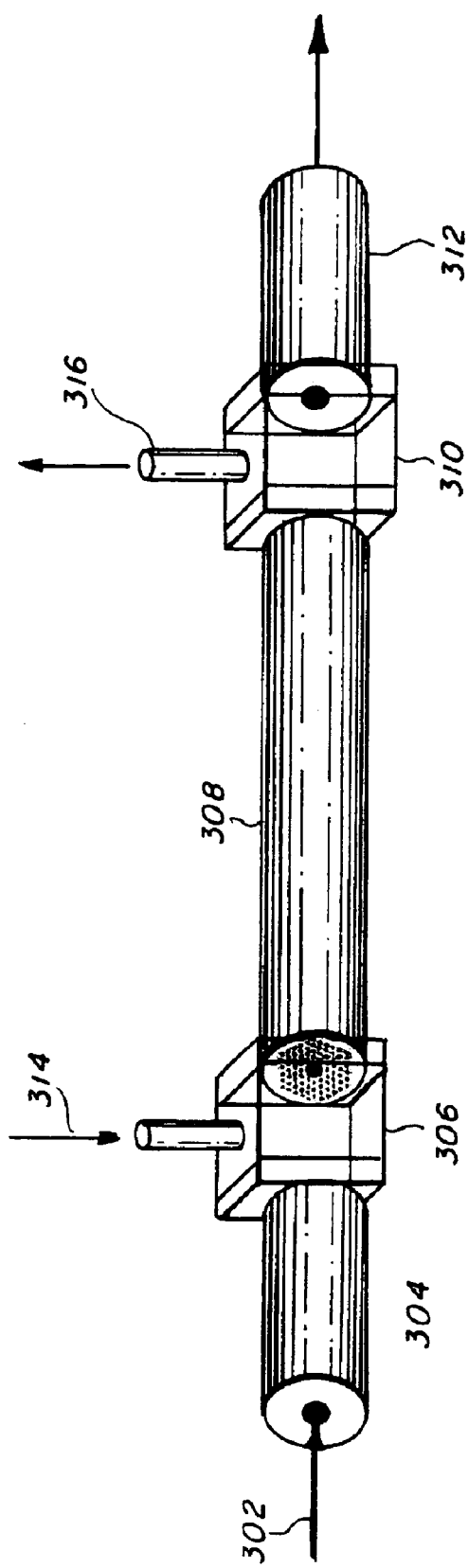
FIG. 3 is a schematic illustration of the use of the hollow core photonic band gap fiber of this invention to sense presence of lower levels of a molecular specie.

FIG. 2 shows the spectrum of acetone recorded in the 6–8 µm wavelength region using the photonic band gap hollow core chalcogenide fiber of this invention with the set-up shown in FIG. 3. These bands are associated with the characteristic bending vibrations of acetone and were used to definitely identify acetone. This is not possible in hollow silica PBG fibers due to attenuation.

It is understood that this disclosure pertains to hollow core photonic band gap fibers made from chalcogenide glasses including sulfides, selenides, tellurides and their mixtures, as well as chalcohalide glasses and other infrared transmitting glasses. It should also be understood that fabrication of the hollow core photonic band gap chalcogenide fibers using the tube stacking technique, described hereinafter, is only one example of fabricating these specially structured fibers.

Fabrication of the photonic band gap chalcogenide glass fiber of this invention was initiated by mixing the glass components in an ampoule using a glove box containing an inert gas, like nitrogen, with less than 100 ppb moisture and less than 1 ppm oxygen. The ampoule was evacuated to about $10^{-5}$ Torr and sealed with an oxygen-methane torch. The ampoule was then placed within a furnace and the glass batch within was allowed to react and then to further purify the batch chemicals by distillation/sublimation. The distillate was re-melted for homogenization and then spun at a high rate exceeding 1000 rpm while the batch was still molten inside the ampoule. During cooling of the molten batch, while still rotating the ampoule, viscosity of the molten batch increased and a tube was formed in the ampoule, annealed and removed at room temperature from the ampoule. The tube was 10 mm×16 mm×12 cm (ID× OD×L) was subsequently drawn into micro-tubes with outside diameter exceeding several hundreds of microns. Similarly, a solid glass rod was drawn into micro-canes with the same diameter as the micro-tubes.

Several courses of the micro-tubes were stacked around a Teflon®—coated mold and several of the micro-canes were stacked around the micro-tubes to provide mechanical integrity. Alternatively, the micro-tube assembly can be placed in a thick walled glass tube. The resulting structure was heat treated in the vicinity of glass transition temperature at an elevated temperature exceeding 175° C., depending on the glass, in an inert atmosphere or vacuum to fuse the micro-tubes and micro-canes together but without leading to deformation of the shape. The inner Teflon®-coated mold was then removed and the structured preform was then drawn into dozens of meters of the photonic band gap glass fiber in a draw tower located inside a clean room.

The fiber loss at this point was about 20 dB/m in the infrared. This high loss is attributed to the use of low precision diameter tubes and relatively impure glass, which lead to scattering losses. The losses can be significantly reduced to less than 0.1 dB/m by using high precision diameter tubes and rods, higher quality glasses and better control of the fiber drawing process. The latter would include better control of draw speed and pressure to control the collapse of the holes around the central hollow core. This would assist greatly in retaining the geometry during fiber drawing. Nevertheless, the purpose herein is not to fabricate the lowest loss infrared fiber based hollow core photonic band gap fiber but to demonstrate capability to process the chalcogenide glasses into a hollow core photonic band gap type structure. This was successfully achieved and can be subsequently improved with better processing control.

FIG. 3 is a schematic illustration of the use of a hollow core photonic band gap chalcogenide glass fiber as a sensor for quantitative presence of an analyte. Referring to FIG. 3, light 302 enters and passes through fiber 304, enters connector 306 and then enters the hollow core photonic band gap chalcogenide glass fiber 308 wherefrom the light passes through connector 310 and out through fiber 312. Analyte 314 enters connector 306 where it is mixed with the light 302 and then the mixture of light and the analyte is passed through connector 306 into fiber 308 and thence into connector 310 where it is separated from the light and exits the connector 310 through conduit 316. Fibers 304 and 312 can be solid core chalcogenide fibers or the hollow core photonic band gap chalcogenide fibers of this invention since they serve merely as conduits for the light. Fiber 308 is a hollow core photonic band gap chalcogenide fiber where interaction between the light and the analyte takes place. Sensitivity of the presence of a substance in the analyte is expected to be at the ppb level and length of fiber 308 is expected to be on the order of a few millimeters and up to 10s of feet long.

Having described the invention, the following examples are given as particular embodiments thereof. It is understood that the examples are given by way of illustration and are not intended to limit the specification or the claims in any manner.

EXAMPLE 1

This example describes the method to fabricate a hollow core photonic band gap fiber from selenide-based chalcogenide glass with composition of $As_{39}Se_{61}$.

The fabrication method included batching arsenic and selenium in pre-cleaned quartz ampoules using a glass box containing nitrogen with less than 100 ppb moisture and less than 1 ppm oxygen. The ampoules were evacuated to about $10^{-5}$ Torr and sealed using an oxygen-methane torch. The ampoules were then placed in a furnace and heated to about 800° C. and the batch allowed to react for about 10 hours and then further distilled to further purify the chemicals. Purification here is based on experience and purity of glass sought is up to about 0.5 dB/m and higher. The distillate was remelted for homogenization and then spun at about 2500 rpm while still molten in the ampoule. During cooling of the melt, while still rotating in the ampoule, the viscosity increased and a tube was formed, annealed and removed from the ampoule at room temperature. The tube, being 10 mm×16 mm×12 cm (ID×OD×L), was subsequently drawn into micro-tubes with outside diameter of about 900 μm. Similarly, a solid glass rod was drawn into micro-canes with the same diameter as the micro-tubes.

The micro-tubes were stacked around a Teflon®-coated mold about 2.7 mm in outside diameter while the micro-canes were stacked around the micro-tubes to provide mechanical integrity. Thus was formed a preform assembly that was heat-treated at about 180° C. for about 2 hours in an inert atmosphere of nitrogen gas to fuse the micro-tubes and the micro-canes together but without leading to deformation of the circular cross-sectioned glass fiber. After fusion, the inner Teflon®-coated mold was removed and the structured preform was then drawn at about 300° C. and at a rate of about 33 m/min into more than 100 meters of hollow core photonic chalcogenide fiber on a draw tower located inside a class 100 clean room. FIG. 1 shows the cross-section of the fiber with an OD of 114 μm, hollow core of 24 μm, a microstructure region in the form of a hexagon with openings of typically 3 μm inside diameter arranged in center-to-center spacing of typically 4.5 μm in a hexagonal arrangement. The solid region was 114 μm from a corner of the hexagon and 106 μm to the side of the hexagon. The fiber loss was 20 dB/m in the infrared.

EXAMPLE 2

This example details the method to fabricate the hollow core photonic band gap fiber from sulfide-based chalcogenide glass with composition of $As_{39}S_6$, but without the outer solid region that provides structural integrity to the fiber, particularly to the microstructured region.

The fiber was made by fabricating tubes, stretching by drawing them to micro-tubes, stacking, fusing and redrawing into fiber of the micro-structured sulfide preform, in a similar manner to Ex. 1 with the exception that there were no outer rods, i.e., micro-canes, used for mechanical integrity. Also, no Teflon®-coated mold was used but instead, the sulfide micro-tubes were stacked around a similar central sulfide micro-tube to form the preform and this was drawn into 95 μm outside diameter fiber. Again, high purity glass and high precision diameter tubes were not used nor was the gas pressure inside the tubes controlled during fiber drawing. Improvements in controlling these parameters will lead to low loss based hollow core photonic band gap fiber based on sulfide glasses as well as other chalcogenide glasses.

EXAMPLE 3

This example describes the use of a selenide fiber of this invention for chemical identification using remote infrared spectroscopy, using the system generally depicted in FIG. 3 but without coupling fibers 304 and 312.

The sensing step includes the steps of directing infrared light into hollow core of the glass fiber of this invention, introducing analyte into the core of the fiber, transmitting the light and the analyte into the core of the fiber, and analyzing the light emanating from the fiber for presence of the analyte. Pursuant to the sensing method, hollow core photonic band gap fiber of Ex. 1 was coupled at one end to a source from an Analect Diamond 20 FTIR spectrometer. The distal end of the fiber was coupled to a liquid nitrogen HgCdTe detector. A small quantity of acetone was drawn into the hollow core through capillary action. The periodic holes were blocked-off with wax prior to this step. The infrared spectrum of acetone was recorded and the relative transmission compared with the same fiber without acetone in the hollow core. FIG. 2 shows the spectrum of acetone recorded in the 6–8 μm wavelength region using the fiber of Ex. 1 of this invention. These bends are associated with the characteristic bending vibrations of acetone and were used to definitely identify acetone. An optimized fiber in terms of low loss ($\leq 0.5$ dB) and long length (10 meters) would possess ppb detection limit.

The fiber of this invention is an infrared transmitting fiber of a chalcogenide glass that has capability to detect significantly lower concentrations of analyte than conventional IR fiber sensors. This is due to the fact that all the light is guided in the hollow core and furthermore, the analyte disposed therein, leads to the greatest interaction with the light over considerably long lengths. In a typical evanescent-based fiber sensors, about 1% of the light can interact with the analyte over lengths on the order of 10 cm resulting in sensitivities of a few 100 ppm. For a hollow core photonic band gap fiber sensor, all the light can interact with the analyte over lengths of tens of meters. This results in a sensitivity increase on the order of $10^5$ and allows detection of the analyte at levels of a few ppb. This is a significantly better than state-of-the-art today.

The fiber of this invention can be coupled to existing solid core chalcogenide fibers, or other coupling fibers including the fibers of this invention, to create an absorption cell using specialized connectors. This can be used for gas and liquid analysis. Obviously, particulate filters can be used in-line to keep the inside of the fibers of this invention clean. An appropriate means for delivery of analyte would include pressure, vacuum or their combination. Also, lenses and/or mirrors can be used for focusing the light into and out of the fibers of this invention. Also, the holes creating the photonic band gap can be plugged with wax, glass, glue or other material, or simply fused/melted shut to prevent contamination and interference from the analyte. Furthermore, the light source can be a laser, i.e., narrow band, broadband, tunable, high power, low power, or other bright source, such as a glow bar. The dimensions of the coupling fiber, i.e., core diameter, outer diameter, divergence, spacing, and the fiber of this invention, can be optimized for efficient coupling.

The fiber sensors of this invention will have an impact in both the military and the commercial sectors. For example, they can be used in facility clean up; biomedical analysis, such as glucose, blood, breath, etc.; chemical, biological warfare agent detection; toxic and hazardous chemical detection; and environmental pollution monitoring and process control. In addition to chemical sensing, the fibers of this invention can be used for very high laser power delivery since the light is predominantly guided in the hollow core, unlike in traditional fibers which possess a solid core that will be damaged at high powers. Furthermore, the commercial sector will also benefit from the fibers of this invention since they reduce system complexity, weight and cost as well as enabling remoting of high power IR lasers for cutting, welding and meteorology, as well as laser surgery, cancer removal and glaucoma treatment. Infrared lasers for biomedical application include $CO_2$ lasers where powers of 10 to 50 watts and higher are needed and cannot be transmitted using current solid core fibers where power limit is about 10 watts.

The laser light delivery system includes a laser light source, the fiber of this invention, a coupler for coupling light from the laser light source to the fiber, and a coupler for coupling the laser light out of the fiber.

While presently preferred embodiments have been shown of the novel hollow core photonic band gap chalcogenide fibers, their fabrication and of the several embodiments discussed, persons skilled in this art will readily appreciate that various additional changes and modifications may be made without departing from the spirit of the invention as defined and differentiated by the following claims.

What is claimed is:

1. A chalcogenide glass optical fiber comprising a central opening for passing light therethrough, a chalcogenide microstructured region disposed around said central opening, and a solid chalcogenide region disposed around said microstructured region for providing structural integrity to said microstructured region; said microstructured region of said fiber has outer diameter in the approximate range of 80–1000 μm; said central opening is at least about 1 μm wide; and said microstructured region is 5–500 μm thick and comprising a plurality of openings arranged in courses with the openings disposed from each other a distance in the approximate range of 1–12 μm and the arrangement of said openings is such as to yield a photonic band gap in the infrared beyond about 2 μm wavelength.

2. Fiber of claim 1 wherein said fiber is circular in cross-section and elongated and said microstructured region is 20–300 μm thick and has air fill fraction of 30–99%.

3. Fiber of claim 2 wherein said central opening is a hollow core that is circular in cross-section and has diameter of 2–200 μm, thickness of said solid region is 5–500 μm, there are at least four courses of said openings in said microstructured region around said hollow core and said openings are 1–10 μm in diameter.

4. Fiber of claim 3 wherein said openings are 1–5 μm in diameter.

5. Fiber of claim 3 wherein said microstructured region is non-circular in cross-section.

6. Fiber of claim 4 wherein said solid region is hexagonal in cross-section and said openings in said microstructured region are arranged in a pattern that produces photonic band gap.

7. Fiber of claim 6 wherein said openings in said microstructured region are arranged in a hexagonal pattern.

8. Fiber of claim 6 wherein said microstructured region and said solid region are arranged concentrically around said hollow core.

9. Fiber of claim 8 wherein said solid region is a circumferential region around and in contact with said microstructured region and said microstructured region has air fill fraction of 40–70%.

10. Fiber of claim 9 including an analyte in said hollow core.

11. Fiber of claim 9 including light in said hollow core, said light having pulse power density exceeding 10 GW/cm$^2$ or power exceeding 10 W.

* * * * *